(12) United States Patent
Chen et al.

(10) Patent No.: US 12,174,148 B1
(45) Date of Patent: Dec. 24, 2024

(54) METHOD FOR DETERMINING THE QUALITY OF DIFFUSION WELDING BY MEANS OF NON-DESTRUCTIVE TESTING

(71) Applicant: UNIVERSKY MATERIAL TECHNOLOGY CO., LTD., Baoding (CN)

(72) Inventors: Xiaoguang Chen, Baoding (CN); Tao Wang, Baoding (CN); Tianxing Niu, Baoding (CN); Rongguang Tian, Baoding (CN); Tiankuo Hu, Baoding (CN); Boyuan Li, Baoding (CN); Guangchao Ma, Baoding (CN)

(73) Assignee: Universky Material Technology Co., Ltd., Baoding (CN)

( * ) Notice: Subject to any disclaimer, the term of this patent is extended or adjusted under 35 U.S.C. 154(b) by 0 days.

(21) Appl. No.: 18/898,497

(22) Filed: Sep. 26, 2024

Related U.S. Application Data

(63) Continuation of application No. PCT/CN2024/092557, filed on May 11, 2024.

(30) Foreign Application Priority Data

Jun. 26, 2023 (CN) .......................... 202310752239.3

(51) Int. Cl.
*G01N 29/06* (2006.01)
*B23K 31/12* (2006.01)

(52) U.S. Cl.
CPC ....... *G01N 29/0645* (2013.01); *B23K 31/125* (2013.01); *G01N 2291/023* (2013.01); *G01N 2291/0289* (2013.01); *G01N 2291/267* (2013.01)

(58) Field of Classification Search
CPC ......... G01N 29/0645; G01N 2291/023; G01N 2291/0289; G01N 2291/267; B23K 31/125
USPC .......................................... 73/597
See application file for complete search history.

(56) References Cited

U.S. PATENT DOCUMENTS

| | | | |
|---|---|---|---|
| 7,516,022 B2 * | 4/2009 | Lee | G01N 3/00 702/33 |
| 7,775,415 B2 * | 8/2010 | Maev | G01N 29/262 228/103 |
| 7,789,286 B2 * | 9/2010 | Maev | G01N 29/262 228/103 |
| 9,733,219 B2 * | 8/2017 | Spencer | G01N 29/0645 |
| 11,994,496 B2 * | 5/2024 | Ghaffari | G06F 30/12 |

FOREIGN PATENT DOCUMENTS

| | | |
|---|---|---|
| CN | 103808796 A | 5/2014 |
| CN | 106064282 A | 11/2016 |
| CN | 106370733 A | 2/2017 |
| CN | 109564197 A | 4/2019 |
| CN | 115684359 A | 2/2023 |
| JP | 2002214207 A | 7/2002 |

* cited by examiner

*Primary Examiner* — Jacques M Saint Surin
(74) *Attorney, Agent, or Firm* — AP3 Law Firm PLLC

(57) ABSTRACT

A method for determining the quality of diffusion welding by means of non-destructive testing comprises the steps of determining a testing method, performing batch testing, establishing a relationship, performing a classification of the mechanical performance data of welded joints, performing a classification of quality levels of different welded interfaces, performing a classification of quality levels of the welded joints, and determining quality levels of the welded joints of to-be-tested workpieces.

3 Claims, 3 Drawing Sheets

```
┌─────────────────────────────────────────────────────────────────────┐
│ Determining to perform ultrasonic testing on diffusion welded       │
│ workpieces, and using an ultrasonic echo amplitude as a             │
│ characterization parameter reflecting a welded joint quality of the │
│ diffusion welded workpieces;                                        │
└─────────────────────────────────────────────────────────────────────┘
                                  ↓
┌─────────────────────────────────────────────────────────────────────┐
│ Performing ultrasonic testing and mechanical performance testing on │
│ a first plurality of diffusion welded workpieces, to obtain         │
│ ultrasonic echo amplitude data and mechanical performance data;     │
└─────────────────────────────────────────────────────────────────────┘
                                  ↓
┌─────────────────────────────────────────────────────────────────────┐
│ Analyzing the ultrasonic echo amplitude data and the mechanical     │
│ performance data, to establish an accurate relationship between     │
│ ultrasonic echo amplitudes and mechanical performance;              │
└─────────────────────────────────────────────────────────────────────┘
                                  ↓
┌─────────────────────────────────────────────────────────────────────┐
│ With reference to standards and requirements related to mechanical  │
│ performance level classification, performing the classification of  │
│ the mechanical performance data;                                    │
└─────────────────────────────────────────────────────────────────────┘
                                  ↓
┌─────────────────────────────────────────────────────────────────────┐
│ Performing a classification of the ultrasonic echo amplitudes       │
│ corresponding to the mechanical performance levels to generate      │
│ quality levels of different welded interfaces;                      │
└─────────────────────────────────────────────────────────────────────┘
                                  ↓
┌─────────────────────────────────────────────────────────────────────┐
│ Determining quality levels of the welded joints based on ratio of a │
│ number of welded interfaces at each of the quality levels of the    │
│ different welded interfaces to a total number of the different      │
│ welded interfaces;                                                  │
└─────────────────────────────────────────────────────────────────────┘
                                  ↓
┌─────────────────────────────────────────────────────────────────────┐
│ Performing ultrasonic testing on the to-be-tested workpieces, and   │
│ obtaining quality lenels of the welded joints based on a ratio of a │
│ number of welded interfaces at each of quality levels of welded     │
│ interfaces to a total number of different welded interfaces of the  │
│ to-be-tested workpieces.                                            │
└─────────────────────────────────────────────────────────────────────┘
```

Fig. 1

METHOD FOR DETERMINING THE QUALITY OF DIFFUSION WELDING BY MEANS OF NON-DESTRUCTIVE TESTING

CROSS-REFERENCE TO RELATED APPLICATIONS

This application is a continuation of International Application No. PCT/CN2024/092557, filed on May 11, 2023 and entitled "method for determining the quality of diffusion welding by means of non-destructive testing", which claims priority to Chinese Patent Application No. 202310752239.3, filed on Jun. 26, 2023 and entitled "method for determining the quality of diffusion welding by means of non-destructive testing". The disclosures of the aforementioned applications are hereby incorporated by reference in their entireties.

TECHNICAL FIELD

The disclosure relates to the technical field of diffusion welding, in particular to a method for determining the quality of diffusion welding by means of non-destructive testing.

BACKGROUND

As a mature welding process, diffusion welding is able to join most materials, and can achieve precise joining of the same material or dissimilar materials. The diffusion welded seam has excellent quality, and the welded joint has the same or similar microstructure and properties to the base metal. Diffusion welding can well realize the welding of large welding area and complex structure, and can realize the simultaneous welding between multiple large planes. The welded joints have the characteristics of high reliability, high static load strength, dynamic load strength, thermal stability and vacuum sealing. Diffusion welding, as an irreplaceable process, has been applied in aerospace, shipbuilding and other fields, especially in the manufacture of key components of many military products. Therefore, it is particularly important to scientifically and reasonably determine the quality of diffusion welding.

Generally speaking, the determination of diffusion welding quality is mostly based on destructive tensile method and metallographic structure detection method, and the diffusion welding quality is intuitively determined through the results of tensile strength values and metallographic structure. For some diffusion welding products, due to the limitation of size and certain special requirements, the diffusion welding quality cannot be determined by destructive methods such as tensile testing and metallographic structure detection. Therefore, it is necessary to seek other methods to determine the welding quality. The non-destructive testing methods can use sound, light, electricity, magnetism, etc., to easily and intuitively reflect and determine the technical state of the inspected object without damaging or affecting the performance of the inspected object, which is an indispensable and effective tool for industrial development. Although the non-destructive testing method cannot improve the quality of welded seam, it can determine the quality of the welded seam and is an effective means of determining the quality of the welded seam.

Commonly used non-destructive testing methods include magnetic particle testing, eddy current testing, liquid penetrant testing, radiography testing, and ultrasonic testing. The above-mentioned commonly used non-destructive testing methods have their own advantages and limitations. Magnetic particle testing is used to detect surface and near-surface defects in ferromagnetic materials. Eddy current testing is not suitable for testing parts with complex shapes and can only detect surface and near-surface defects in conductive materials. Liquid penetrant testing can only detect defects in surface openings and the surface distribution of defects. Magnetic particle testing, eddy current testing and liquid penetrant testing are not suitable for detecting the internal defects of diffusion welded joints, that is, the internal defects of the welded surface, and the testing results are also easily disturbed by the material itself and other factors. Radiography testing is suitable for detecting volumetric defects, which is relatively expensive and slow. Ultrasonic testing is suitable for non-destructive testing of various specimens such as metal, non-metal and composite materials, which can detect the internal defects of the specimens in a large thickness range, and the defect positioning is more accurate, the detection rate of area-type defects is higher, the sensitivity is high, and the internal defects with small size of the specimen can be detected. The detection cost is low, and the speed is fast. It is harmless to the human body and the environment, and it is convenient to use on site. The defects of diffusion welded joints are mostly area type and line type defects, and there are few volume type defects such as porosity and inclusions, and these area type and line type defects are located inside the welded surface (welded interface). Therefore, non-destructive testing methods suitable for diffusion welding must be able to quantitatively detect internal defects as area type and line type defects, such as ultrasonic testing and radiography testing.

The Chinese patent CN103808797B discloses a method for determining the quality of diffusion welding, which uses the water-immersed ultrasonic longitudinal wave pulse reflection method. Firstly, according to the ultrasonic echo waveform and amplitude of the welded interface, the welding complete area with the lowest amplitude is determined. Taking the ultrasonic echo amplitude of the welded interface in the welding complete area as 10%~80% of the full screen as the scanning reference sensitivity, the entire workpiece is scanned. The workpiece is evaluated based on defect judgment criterion that the ultrasonic echo amplitude of the welded interface is higher than 80% of the full screen.

Although the patent CN103808797B provides a method for determining the quality of diffusion welding by ultrasonic testing, it cannot accurately and quantitatively evaluate the quality of diffusion welding. In addition, in the patent CN103808797B, the welding complete area in the workpiece is determined by ultrasonic testing to determine the unwelded area in the workpiece, so as to determine the quality of the product. According to this method, if the actual welding complete area that is considered to be a welding complete area has poor welding quality, it is a problem to judge the quality of the unwelded area. The span of scanning reference sensitivity ranging from 10% to 80% is large, and it is unreasonable to determine whether the diffusion welding product is qualified or not with the sensitivity of this large span. Moreover, it is also controversial to use the ultrasonic echo amplitude of the welded interface higher than 80% of the full screen as the defect judgment standard, that is, not all of the actual defects have an ultrasonic echo amplitude greater than 80%. Therefore, it is necessary to seek an accurate quantitative evaluation method for ultrasonic testing to determine the quality of diffusion welding.

The Chinese Patent CN115684359A discloses a method for constructing an ultrasonic testing method for aluminum alloy brazing defects, which uses ultrasonic testing to perform C-scan on the product. By observing the defect size, ultrasonic echo amplitude and other indicators on the C-scan diagram, the defect size of the qualified product and the range of the ultrasonic echo amplitude are determined based on the requirements of the qualified product for the metallographic structure bonding ratio and tensile strength, and combined with the testing of the product's metallographic structure bonding ratio and tensile strength, the correspondence between non-destructive testing and destructive testing.

The patent CN115684359A establishes the correspondence between non-destructive testing and destructive testing (strength, metallographic), and finally achieves that the product quality levels can be determined only by observing the results of the C-scan in the process of product testing. The idea mentioned in the patent CN115684359A is a conventional idea that can be thought of by personnel with welding technology, and is universal without constraints. In addition, the logic of determining the ultrasonic echo amplitude and the size of the defect in this patent is also unreasonable. The patent first divides the ultrasonic echo amplitude into stages, and then determines the correspondence among the different ultrasonic echo amplitudes, the tensile strength of the product and the metallographic structure bonding ratio. This will cause the stage division of ultrasonic echo amplitude to be inaccurate or there is no basis for division, which will have a great impact on the accuracy of the subsequent product qualification criteria. A more reasonable process should be to first determine the correspondence between different ultrasonic echo amplitudes and tensile strength, that is, to obtain accurate tensile strength corresponding to different ultrasonic echo amplitudes through a large amount of data. Second, according to the correspondence between the accurate ultrasonic echo amplitudes and the tensile strength, as well as the strength requirements of the product, the stages of accurate ultrasonic echo amplitude are further divided. In this way, the range of ultrasonic echo amplitude in the product qualification criterion will be determined.

In summary, patents CN103808797B and CN115684359A cannot accurately and quantitatively determine the quality of diffusion welding. At present, there is no reliable basis for non-destructive testing for determining the quality of diffusion welding at home and abroad. Therefore, there is an urgent need for a non-destructive testing method to determine the quality of diffusion welding.

SUMMARY

These and other problems are generally solved or circumvented, and technical advantages are generally achieved, by embodiments of the present disclosure which provide a method for determining the quality of diffusion welding by means of non-destructive testing.

Technical Problems

The purpose of the present application is to provide a method for determining the quality of diffusion welding by means of non-destructive testing to solve the problems in the background art.

Technical Solutions

The technical solution adopted in this application is:

A method for determining the quality of diffusion welding by means of non-destructive testing includes the following steps 1 to 7.

Step 1, determining a testing method, comprising: determining to perform ultrasonic C scanning on diffusion welded workpieces by using an ultrasonic testing, and determining to use an ultrasonic echo amplitude as a characterization parameter reflecting a welded joint quality of the diffusion welded workpiece.

Step 2, performing batch testing, comprising: successively performing the ultrasonic testing and a mechanical performance testing on a first plurality of diffusion welded workpieces, to obtain ultrasonic echo amplitude data and mechanical performance data of positions of welded joints of the first plurality of diffusion welded workpieces, the mechanical performance data comprising a tensile strength.

Step 3, establishing a relationship, comprising: analyzing the ultrasonic echo amplitude data and the mechanical performance data of the positions of the welded joints of the first plurality of diffusion welded workpieces, to establish an accurate relationship between ultrasonic echo amplitude and mechanical performance.

Step 4, performing a classification of the mechanical performance data of the positions of the welded joints of the first plurality of diffusion welded workpieces, comprising: with reference to standards and requirements related to mechanical performance level classification, performing the classification of the mechanical performance data of the positions of the welded joints of the first plurality of diffusion welded workpieces obtained in step 2, to generate mechanical performance levels of the mechanical performance data.

Step 5, performing a classification of quality levels of different welded interfaces of the welded joints of the first plurality of diffusion welded workpieces, comprising: performing a classification of the ultrasonic echo amplitudes corresponding to the mechanical performance levels to generate the quality levels of the different welded interfaces of the welded joints of the first plurality of diffusion welded workpieces.

Step 6, performing a classification of quality levels of the welded joints of the first plurality of diffusion welded workpieces, comprising: determining the quality levels of the welded joints of the first plurality of diffusion welded workpieces based on a ratio of a number of welded interfaces at each of the quality levels of the different welded interfaces to a total number of the different welded interfaces. And Step 7, determining quality levels of welded joints of to-be-tested workpieces, comprising: performing the ultrasonic testing on the to-be-tested workpieces, and obtaining the quality levels of the welded joints of the to-be-tested workpieces based on a ratio of a number of welded interfaces at each of quality levels of welded interfaces to a total number of different welded interfaces of the to-be-tested workpieces.

As an embodiment of the present application, in step 1, determining to perform the ultrasonic C scanning on the diffusion welded workpieces includes: determining to use a water immersion ultrasonic longitudinal wave pulse reflection method on the diffusion welded workpieces.

As an embodiment of the present application, the standard for performing the classification of the mechanical performance data of the positions of the welded joints of the first plurality of diffusion welded workpieces in step 4 is: level 1, where the tensile strength of the welded joint is greater than or equal to 90% of a lower limit of the tensile strength of the base material; level 2, where the tensile strength of the welded joint is greater than or equal to 80% of the lower limit of the tensile strength of the base material; and level 3, where the tensile strength of the welded joint is less than 80% of the lower limit of the tensile strength of the base material.

As an embodiment of the present application, the standard for performing the classification of the quality levels of the different welded interfaces of the welded joints of the first plurality of diffusion welded workpieces in step 5 is: level A, where the ultrasonic echo amplitude (echo height) is less than or equal to 1%, and the ratio of the tensile strength is greater than or equal to 95%; level B, where the ultrasonic echo amplitude is greater than 1% and less than or equal to 2%, and the ratio of tensile strength is greater than or equal to 85%; level C, where the ultrasonic echo amplitude is greater than 2% and less than or equal to 3%, and the ratio of tensile strength is greater than 75%; and level D, where the ultrasonic echo amplitude is greater than 3%.

As an embodiment of the present application, the standard for performing the classification of the quality levels of the welded joints of the first plurality of diffusion welded workpieces in step 6 is: level I, where the ratio of a number of level A welded interfaces to the total number is greater than or equal to 85%, the ratio of a number of level A and level B welded interfaces to the total number is greater than or equal to 90%, and the ratio of a number of level A, level B and level C welded interfaces to the total number is greater than or equal to 95%; level II, where the ratio of the number of level A welded interface to the total number is greater than or equal to 80%, the ratio of the number of level A and level B welded interfaces to the total number is greater than or equal to 85%, and the ratio of the number of level A, level B and level C welded interfaces to the total number is greater than or equal to 90%; level III, where the ratio of the number of level A and level B welded interfaces to the total number is greater than or equal to 80%, and the ratio of the number of level A, level B and level C welded interfaces to the total number is greater than or equal to 85%.

Advantageous Effects of the Disclosure

The application provides a method for determining the quality of diffusion welding by means of non-destructive testing. In the present application, the correspondence between the proportion of the echo amplitude interval of the ultrasonic C-scan (a ratio of a number of each of the quality levels of the different welded interfaces to a total number of different welded interfaces) and the tensile strength is determined, on this basis, combined with the random distribution state of the ultrasonic echo amplitude of the welded interface, the ultrasonic echo amplitude area is accurately divided, and finally the quality levels of diffusion welding is determined only by the proportion of the ultrasonic echo amplitude interval. The method can realize the determination and quantitative evaluation of the quality of diffusion welding, which is more accurate than determining the welding quality by the bonding ratio. In the present application, on the premise of not affecting the use performance of diffusion welded product, the quality levels of the product can still be accurately determined or a qualified product can be screened, which has the advantages of accurate determination, saving products and low costs.

BRIEF DESCRIPTION OF THE DRAWINGS

FIG. 1 is a flowchart of a method for determining the quality of diffusion welding by means of non-destructive testing according to an embodiment of the present application;

DETAILED DESCRIPTION OF ILLUSTRATIVE EMBODIMENTS

Figure 2:
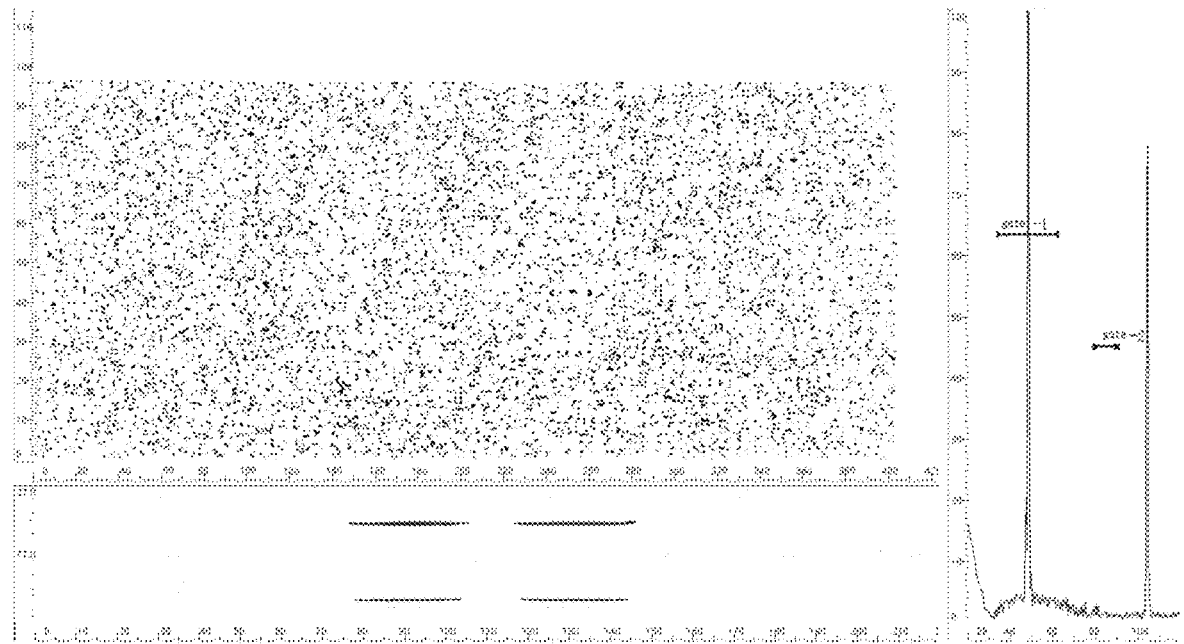
FIG. 2 is a C-scan image of the workpiece with an ultrasonic echo amplitude of 0 to 3% according to an embodiment of the present application.

In order to better illustrate the present application, further details are given below through specific embodiments and drawings.

A method for determining the quality of diffusion welding by means of non-destructive testing, which can accurately determine the quality of diffusion welding by means of ultrasonic testing, can classify different diffusion welding quality levels according to requirements, and can also screen out a non-qualified diffusion welded product according to welded seam quality related requirements of a specific product.

The application provides a method for determining the quality of diffusion welding by means of non-destructive testing. In the present application, the correspondence between the proportion of the ultrasonic echo amplitude interval and the tensile strength is determined, and the quality levels of diffusion welding is determined only by the proportion of the ultrasonic echo amplitude interval, which is more accurate than determining the welding quality by the bonding ratio. The specific reason is that the C-scan image in ultrasonic detection of the entire welded joint is composed of echoes with different heights, and the number of the echoes is n, whether it is a brazed or diffused welded joint. The bonding ratio refers to a ratio of a bonding area to a total welded area. A standard block is found corresponding to different detection levels, and an ultrasonic echo amplitude of a defect equivalent in the standard block is taken as a qualified threshold, and a point where the ultrasonic echo amplitude is less than the qualified threshold is a bonding point. The ultrasonic echo amplitude of the whole welded interface of the workpiece is not evenly or regularly distributed, but randomly distributed on the whole welded interface according to actual welding quality, that is to say, the ultrasonic echo amplitude of each point on the welded interface corresponds to the different welding quality. Assuming that the quality level is fixed, only a qualified threshold of 10% is given to calculate the bonding ratio, and according to the method for calculating the bonding ratio, the bonding ratio of the workpiece may meet the requirement. For example, the bonding ratio is 85%, but the ratio (interface proportion) of the interface having the ultrasonic echo amplitude within 10% to the total welding area may also be different. For example, the interface proportion of the ultrasonic echo amplitude of the A joint being less than 1% is 50%, the interface proportion of the ultrasonic echo amplitude of the A joint being less than 5% is 80%, the interface proportion of the ultrasonic echo amplitude of the A joint being less than 10% is 85%, the bonding ratio of the A joint is 85%, and the tensile strength is a. The interface proportion of the ultrasonic echo amplitude of the B joint being less than 1% is 70%, the interface proportion of the ultrasonic echo amplitude of the B joint being less than 5% is 85%, the interface proportion of the ultrasonic echo amplitude of the B joint being less than 10% is 85%, the bonding ratio of the B joint is also 85%, the tensile strength is b, and the numerical values of a and b are necessarily different.

The present application determines a correlation between ultrasonic echo amplitudes and tensile strength by means of a large amount of experimental data. On this basis, in conjunction with ultrasonic echo amplitude of a welded interface being distributed randomly, the proportion of the ultrasonic echo amplitude interval is precisely divided, and the proportion of the ultrasonic echo amplitude interval is used to represent and determine the quality levels of the welded interface. The logic of the present application is stricter, and determination of diffusion welding quality is more accurate. The proportion of the ultrasonic echo amplitude interval (namely, different levels of interface proportion) is counted according to 0 to 1%, 0 to 2%, 0 to 3% . . . 0 to 100%. The proportion of each ultrasonic echo amplitude interval is precisely defined (accurate proportion division), which can avoid that the welding quality of a workpiece is determined to be qualified according to conventional bonding ratio calculation, but the tensile strength levels cannot be precisely determined in a bonding region, and a situation that a certain point or a certain region is not bonded so that actual welding quality does not meet a requirement occurs. Therefore, the determination of the quality of diffusion welding or brazing by the proportion of ultrasonic echo amplitude interval is more accurate compared to the bonding ratio.

When the tensile strength and the ultrasonic echo amplitude of a welded joint are corresponded, a standard tensile joint is generally used for testing. The total welded area of the standard tensile joint is small, the ultrasonic echo amplitude of the standard tensile joint is close overall, and the ultrasonic echo amplitude of the standard tensile joint can be within an error of ±0.5. For example, for a single standard tensile joint, a welded joint having an ultrasonic echo amplitude of 0 to 1% may have a tensile strength, a welded joint having an ultrasonic echo amplitude of 1% to 2% may have a tensile strength, and a welded joint having an ultrasonic echo amplitude of 2% to 3% may have a tensile strength. In this way, welded joints of different ultrasonic echo amplitudes may be classified, and different welded joint levels are determined. However, the size of a workpiece is different, and it is generally impossible to reach that the ultrasonic echo amplitude of the whole welded interface is within an error of ±0.5. The proportion of ultrasonic echo amplitude interval is different, and the quality of the corresponding welded interface is also different. Therefore, after a level evaluation is performed on the welded joint, it is also necessary to divide the proportion of ultrasonic echo amplitude interval, so as to divide the welding quality of the welded interface in levels.

Due to different welding quality, there are usually cases where the bonding ratio is the same while the tensile strength is different at the welded joint. For example, the bonding ratio of three tensile samples in the same state is 85%, but the tensile strengths represent 90%, 80% and 70% of the strength of the base material, respectively. In practical applications, such phenomenon of differences can be great in number. In order to further reduce this differences and make the determination result more accurate, the tensile sample is further subdivided into n points (n points being the number of points evenly swept in the tensile sample in the ultrasonic testing, i.e. pixel points in a C-scan image). Then combining the C-scan image with A-scan data, the ultrasonic echo amplitudes of these points are in one-to-one correspondence. We have found that there is also a difference in the ultrasonic echo amplitudes between a point and another points, and we define each point as a welded interface. In the same workpiece, welded interfaces are divided into different levels according to different echo heights. N welded interfaces (pixel points) form a welded joint. The ultrasonic echo amplitudes of welded interfaces in each welded joint are different, and this difference causes a difference in mechanical performance of the welded joint, i. e. quality levels of the welded joint.

With reference to standards and requirements related to the classification of welded joint mechanical performance, lower limit ratios of corresponding interfaces of different levels in welded joints of different mechanical performance levels are divided, thereby finally achieving the purpose of precisely ranking the quality levels of welded joints.

FIG. 1 shows a specific process of a non-destructive detection and determination method. In the present embodiment, 500 diffusion welding samples of aluminum alloy plate were detected, and the accuracy of the detection result in the present application is proved. The method specifically includes the following steps.

Step 1, determining a testing method, comprising: it was determined to perform ultrasonic C scanning on the diffusion welded samples by using a water immersion ultrasonic longitudinal wave pulse reflection method, and the ultrasonic echo amplitude was used as a characterization parameter reflecting a welded joint quality of the diffusion welded samples.

Figure 3:
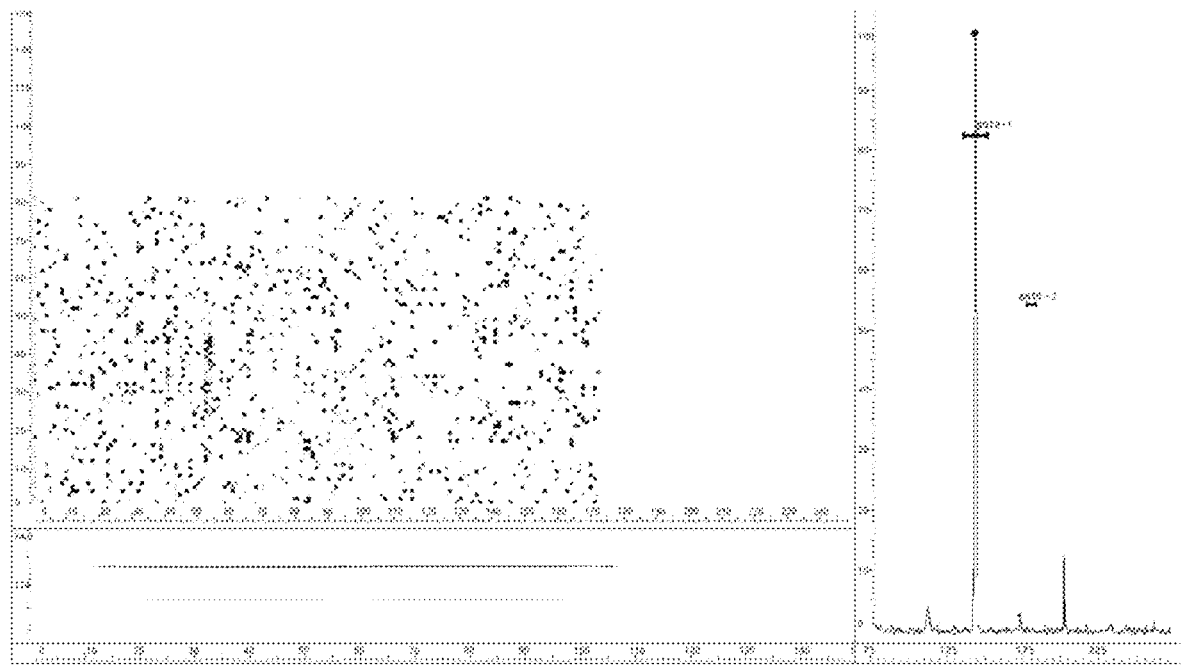
FIG. 3 is a C-scan image of the workpiece with an ultrasonic echo amplitude of 0 to 5% according to an embodiment of the present application.
Figure 4:
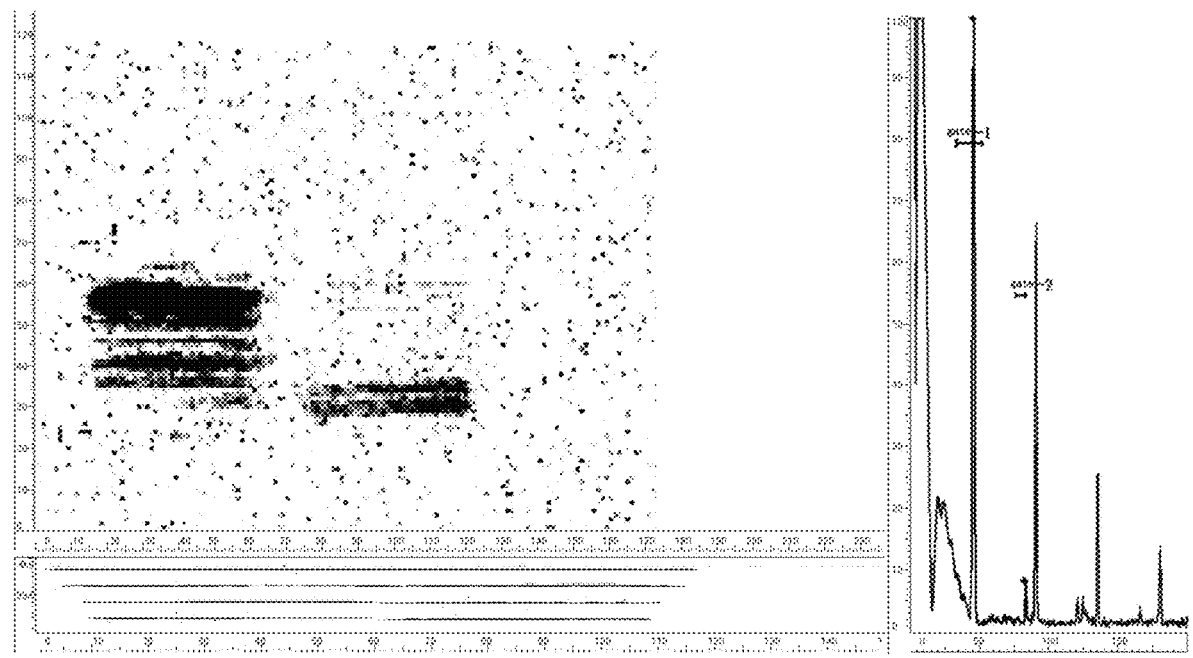
FIG. 4 is a C-scan image of the workpiece with an ultrasonic echo amplitude greater than 5% according to an embodiment of the present application.

Step 2, performing batch testing, comprising: an ultrasonic testing was performed on 500 diffusion welded samples of aluminum alloy plate to obtain ultrasonic echo amplitude data of welded joints of a plurality of diffusion welded samples of aluminum alloy plate (typical results were shown in FIGS. 2 to 4). In FIG. 2 to FIG. 4, in the left-side diagram, the horizontal axis and the vertical axis both represent a scanning size (distance), and the unit is millimeter (mm). In the right-side waveform image, the horizontal axis represents time, and the unit is second(s); the vertical axis represents an ultrasonic echo amplitude, and the unit is percentage (%); and the gate shown in the FIGS. 2 to 4 represents an imaging tool of a device.

Thereafter, a mechanical performance testing was performed on the 500 diffusion welded samples of aluminum alloy plate to obtain mechanical performance data (tensile strength data) of the welded joints of the plurality of diffusion welded samples of aluminum alloy plate.

Step 3, establishing a relationship, comprising: the C-scan data (ultrasonic echo amplitude data) and the tensile strength data were in one-to-one correspondence, and invalid data was excluded by analysis, to establish an accurate relationship between the ultrasonic echo amplitudes and the tensile strength.

In ultrasonic testing, the C-scan image of the entire welded joint consists of ultrasonic echoes with different heights, and the number of the ultrasonic echoes is n. Hence, a plurality of tensile samples can be cut off in each of the diffusion welded samples of aluminum alloy plate. When cutting off the tensile samples, it should be noted that the proportion of the ultrasonic echo amplitude interval in the tensile sample area needs to be precisely calculated to precisely cut off the tensile sample area, and to determine a relatively accurate tensile strength range under the proportion of the ultrasonic echo amplitude interval.

Step 4, performing a classification of the mechanical performance data of the welded joints of the plurality of diffusion welded samples of aluminum alloy plate, comprising: with reference to the relevant standards and requirements of grading division of joint mechanical performance in Chapter 5.2 in Technical Requirements of Structural Steel and Stainless Steel Fusion Welding, published by the People's Republic of China Aerospace Industry Standard QJ 1842A-2011, the classification was performed on the mechanical performance data of the welded joints of the plurality of diffusion welded samples of aluminum alloy plate in step 2, to generate mechanical performance levels of the mechanical performance data. The standard for performing the classification of the mechanical performance data of the welded joints is: level 1, where the tensile strength of the welded joint is greater than or equal to 90% of a lower limit of the tensile strength of the base material; level 2, where the tensile strength of the welded joint is greater than or equal to 80% of the lower limit of the tensile strength of the base material; and level 3, where the tensile strength of the welded joint is less than 80% of the lower limit of the tensile strength of the base material.

Step 5, performing a classification of quality levels of different welded interfaces of the welded joints of the plurality of diffusion welded samples of aluminum alloy plate, comprising: in conjunction with step 3 and step 4, the classification of the ultrasonic echo amplitudes corresponding to the mechanical performance levels was performed to generate the quality levels of different welded interfaces. The standard for performing the classification of the quality levels of the different welded interfaces is: level A, where the ultrasonic echo amplitude is less than or equal to 1%, and the ratio of the tensile strength is greater than or equal to 95%; level B, where the ultrasonic echo amplitude is greater than 1% and less than or equal to 2%, and the ratio of tensile strength is greater than or equal to 85%; level C, where the ultrasonic echo amplitude is greater than 2% and less than or equal to 3%, and the ratio of tensile strength is greater than 75%; and level D, where the ultrasonic echo amplitude is greater than 3%. The ratio of tensile strength refers to a ratio of the tensile strength of the welded joint to the lower limit of the tensile strength of the base material.

The quality levels of different welded interfaces were as shown in Table 1.

TABLE 1

| The quality levels of different welded interfaces | | | | |
|---|---|---|---|---|
| Quality levels of different welded interfaces | Level A | Level B | Level C | Level D |
| Echo height (ECHO DEPTH) | ECHO DEPTH < 1% | 1% < ECHO DEPTH ≤ 2% | 2% < ECHO DEPTH ≤ 3% | ECHO DEPTH > 3% |
| Ratio of the tensile strength | ≥95% | ≥85% | ≥75% | No requirements |

Step 6, performing a classification of quality levels of the welded joints of the plurality of diffusion welded samples of aluminum alloy plate, comprising: the quality levels of the welded joints of the plurality of diffusion welded samples of aluminum alloy plate were determined based on the ratio of a number of welded interfaces at each of the quality levels of different welded interfaces to a total number of different welded interfaces. The standard for performing the classification of the quality levels of the welded joints is: level I, where the ratio of a number of level A of welded interfaces to the total number of different welded interfaces is greater than or equal to 85%, the ratio of the number of level A and level B welded interfaces to the total number of different welded interfaces is greater than or equal to 90%, and the ratio of the number of level A, level B and level C welded interfaces to the total number of different welded interfaces is greater than or equal to 95%; level II, where the ratio of the number of level A welded interfaces to the total number of different welded interfaces is greater than or equal to 80%, the ratio of the number of level A and level B welded interfaces to the total number of different welded interfaces is greater than or equal to 85%, and the ratio of the number of level A, level B and level C welded interfaces to the total number of different welded interfaces is greater than or equal to 90%; level III, where the ratio of the number of level A and level B welded interfaces to the total number of different welded interfaces is greater than or equal to 80%, and the ratio of the number of level A, level B and level C welded interfaces to the total number of different welded interfaces is greater than or equal to 85%.

The quality levels of aluminum alloy diffusion welded joints were as shown in Table 2.

TABLE 2

| The quality levels of aluminum alloy diffusion welded joints | | | |
|---|---|---|---|
| Quality levels of diffusion welded joints | Level I | Level II | Level III |
| Ratio of level A | ≥85% | ≥80% | No |
| Ratio of level A and level B | ≥90% | ≥85% | ≥80% |
| Ratio of level A, level B and level C | ≥95% | ≥90% | ≥85% |

500 diffusion welded samples of aluminum alloy plate were detected by means of the ultrasonic detection method, and the classification of quality levels of the welded joints of the 500 diffusion welded samples of aluminum alloy plate was performed according to the proportion of the ultrasonic echo amplitude interval shown in C-scan images. 487 diffusion welded samples of aluminum alloy plate were level I welded joints, 9 diffusion welded samples of aluminum alloy plate were level II welded joints, and 4 diffusion welded samples of aluminum alloy plate were level III welded joints. Subsequently, a tensile strength test was performed on the 500 diffusion welded samples of aluminum alloy plate to generate quality levels. The judgement result determined in this application was compared with the quality levels determined through tensile strength testing, and the two results are completely consistent, indicating that the method provided in the present application is accurate and reliable.

Step 7, the ultrasonic testing was performed on the to-be-tested workpieces, and the welded joints of the to-be-tested workpieces were classified according to the quality levels of the welded joints of the plurality of diffusion welded samples of aluminum alloy plate determined in step 6, to obtain the quality levels of the welded joints of the to-be-tested workpieces based on a ratio of a number of welded interfaces at each of the quality levels of welded interfaces to a total number of different welded interfaces of the to-be-tested workpieces (that is the proportion of the ultrasonic echo amplitude interval in C-scan images).

What is claimed is:

1. A method for determining the quality of diffusion welding by means of non-destructive testing, comprising:
   step 1, determining a testing method, comprising: determining to perform ultrasonic C scanning on diffusion welded workpieces by using an ultrasonic testing, and determining to use an ultrasonic echo amplitude as a characterization parameter reflecting a welded joint quality of the diffusion welded workpieces;
   step 2, performing batch testing, comprising: successively performing the ultrasonic testing and a mechanical performance testing on a first plurality of diffusion welded workpieces, to obtain ultrasonic echo amplitude data and mechanical performance data of positions of welded joints of the first plurality of diffusion welded workpieces, the mechanical performance data comprising a tensile strength;
   step 3, establishing a relationship, comprising: analyzing the ultrasonic echo amplitude data and the mechanical performance data of the positions of the welded joints of the first plurality of diffusion welded workpieces, to establish an accurate relationship between ultrasonic echo amplitudes and mechanical performance;
   step 4, performing a classification of the mechanical performance data of the positions of the welded joints of the first plurality of diffusion welded workpieces, comprising: with reference to standards and requirements related to mechanical performance level classification, performing the classification of the mechanical performance data of the positions of the welded joints of the first plurality of diffusion welded workpieces obtained in step 2, to generate mechanical performance levels of the mechanical performance data;
   step 5, performing a classification of quality levels of different welded interfaces of the welded joints of the first plurality of diffusion welded workpieces, comprising: performing a classification of the ultrasonic echo amplitudes corresponding to the mechanical performance levels to generate the quality levels of the different welded interfaces of the welded joints of the first plurality of diffusion welded workpieces;
   wherein a standard for performing the classification of the quality levels of the different welded interfaces of the welded joints of the first plurality of diffusion welded workpieces is: level A, where the ultrasonic echo amplitude is less than or equal to 1%, and a ratio of the tensile strength is greater than or equal to 95%; level B, where the ultrasonic echo amplitude is greater than 1% and less than or equal to 2%, and the ratio of the tensile strength is greater than or equal to 85%; level C, where the ultrasonic echo amplitude is greater than 2% and less than or equal to 3%, and the ratio of the tensile strength is greater than 75%; and level D, where the ultrasonic echo amplitude is greater than 3%;
   step 6, performing a classification of quality levels of the welded joints of the first plurality of diffusion welded workpieces, comprising: determining the quality levels of the welded joints of the first plurality of diffusion welded workpieces based on a ratio of a number of welded interfaces at each of the quality levels of the different welded interfaces to a total number of the different welded interfaces;
   wherein a standard for performing the classification of the quality levels of the welded joints of the first plurality of diffusion welded workpieces is: level I, where a ratio of a number of level A welded interfaces to the total number is greater than or equal to 85%, a ratio of a number of level A and level B welded interfaces to the total number is greater than or equal to 90%, and a ratio of a number of level A, level B and level C welded interfaces to the total number is greater than or equal to 95%; level II, where the ratio of the number of level A welded interfaces to the total number is greater than or equal to 80%, the ratio of the number of level A and level B welded interfaces to the total number is greater than or equal to 85%, and the ratio of the number of level A, level B and level C welded interfaces to the total number is greater than or equal to 90%; level III, where the ratio of the number of level A and level B welded interfaces to the total number is greater than or equal to 80%, and the ratio of the number of level A, level B and level C welded interfaces to the total number is greater than or equal to 85%; and
   step 7, determining quality levels of welded joints of to-be-tested workpieces, comprising: performing the ultrasonic testing on the to-be-tested workpieces, and obtaining the quality levels of the welded joints of the to-be-tested workpieces based on a ratio of a number of welded interfaces at each of quality levels of welded interfaces to a total number of different welded interfaces of the to-be-tested workpieces.

2. The method of claim 1, wherein in step 1, determining to perform the ultrasonic C scanning on the diffusion welded workpieces comprises: determining to use a water immersion ultrasonic longitudinal wave pulse reflection method on the diffusion welded workpieces.

3. The method of claim 1, wherein a standard for performing the classification of the mechanical performance data of the positions of the welded joints of the first plurality of diffusion welded workpieces in step 4 is: level 1, where a tensile strength of a welded joint is greater than or equal to 90% of a lower limit of a tensile strength of a base material; level 2, where the tensile strength of the welded joint is greater than or equal to 80% of the lower limit of the tensile strength of the base material; and level 3, where the tensile strength of the welded joint is less than 80% of the lower limit of the tensile strength of the base material.

* * * * *